United States Patent
Foley et al.

(10) Patent No.: US 10,069,377 B2
(45) Date of Patent: Sep. 4, 2018

(54) FLYWHEEL ASSEMBLY

(75) Inventors: Ian D. Foley, Forncett St. Mary (GB);
Colin Tarrant, Kelsall (GB)

(73) Assignee: Williams Hybrid Power Limited (GB)

( * ) Notice: Subject to any disclaimer, the term of this patent is extended or adjusted under 35 U.S.C. 154(b) by 840 days.

(21) Appl. No.: 13/057,783

(22) PCT Filed: Aug. 13, 2009

(86) PCT No.: PCT/GB2009/051020
§ 371 (c)(1),
(2), (4) Date: May 23, 2011

(87) PCT Pub. No.: WO2010/020806
PCT Pub. Date: Feb. 25, 2010

(65) Prior Publication Data
US 2011/0214528 A1 Sep. 8, 2011

(30) Foreign Application Priority Data

Aug. 18, 2008 (GB) .................................. 0815067.4

(51) Int. Cl.
*H02K 7/02* (2006.01)
*F16F 15/315* (2006.01)

(52) U.S. Cl.
CPC ........... *H02K 7/025* (2013.01); *F16F 15/315* (2013.01); *Y02E 60/16* (2013.01); *Y10T 74/2132* (2015.01)

(58) Field of Classification Search
CPC .. H02K 1/187; H02K 7/025; Y10T 29/49009; Y10T 74/2121; Y10T 74/2117;
(Continued)

(56) References Cited

U.S. PATENT DOCUMENTS 4,244,240 A 1/1981 Rabenhorst
4,617,484 A * 10/1986 Buijsen .......................... 310/51
(Continued)

FOREIGN PATENT DOCUMENTS

EP 0821464 A2 1/1998
GB 2305992 A 4/1997
(Continued)

OTHER PUBLICATIONS

UK Intellectual Property Office Search Report for corresponding application No. GB0815067.4, dated Jun. 19, 2009.
(Continued)

*Primary Examiner* — Thomas C Diaz
(74) *Attorney, Agent, or Firm* — Barnes & Thornburg LLP

(57) ABSTRACT

A flywheel assembly is provided which comprises a housing, a flywheel rotatably mounted in the housing and defining an inner and an outer circumferential surface, and an inner body spaced radially and inwardly from the inner circumferential surface of the flywheel. The flywheel rotates in use around and relative to the inner body, the assembly defines an engagement surface spaced radially and outwardly from the outer circumferential surface of the flywheel, and the inner body is flexibly coupled to the housing. If the flywheel mounting fails during rotation at speed leading to displacement of the flywheel, flexure of the coupling as a result of forces exerted on the inner body by the displaced flywheel allows the flywheel to contact the engagement surface.

17 Claims, 3 Drawing Sheets

(58) Field of Classification Search
CPC .............. Y10T 74/2119; Y10T 74/2125; Y10T 74/2131; Y10T 74/2132; Y02E 60/16; F16F 15/315
USPC ........ 74/572.2, 573.12, 572.1, 572.21, 574.4, 74/574.3; 192/223.1; 188/184, 185; 310/51, 153, 74, 90
See application file for complete search history.

(56) References Cited

U.S. PATENT DOCUMENTS

| | | | |
|---|---|---|---|
| 4,647,803 A * | 3/1987 | von der Heide et al. | 310/51 |
| 4,679,761 A | 7/1987 | Small | |
| 4,783,608 A * | 11/1988 | Gruber et al. | 310/90 |
| 5,235,227 A * | 8/1993 | Fazekas | 310/51 |
| 5,363,003 A * | 11/1994 | Harada et al. | 310/67 R |
| 5,760,508 A | 6/1998 | Jennings et al. | |
| 6,809,898 B1 * | 10/2004 | Prochazka | 360/99.08 |
| 6,987,336 B2 * | 1/2006 | Streng et al. | 310/51 |
| 7,417,345 B2 * | 8/2008 | Chen et al. | 310/90.5 |
| 7,659,644 B2 * | 2/2010 | Fukuno et al. | 310/51 |
| 2003/0061898 A1 | 4/2003 | Brackett et al. | |
| 2008/0143198 A1 * | 6/2008 | Bi et al. | 310/51 |

FOREIGN PATENT DOCUMENTS

| | | |
|---|---|---|
| SU | 131228 | 5/1987 |
| SU | 1312281 | 5/1987 |

OTHER PUBLICATIONS

International Search Report and Written Opinion for corresponding application No. PCT/GB2009/051020, dated Oct. 13, 2009.

* cited by examiner

FLYWHEEL ASSEMBLY

CROSS-REFERENCE TO RELATED APPLICATIONS

This is the U.S. national phase of International Application No. PCT/GB2009/051020, filed Aug. 13, 2009, which claims the benefit of United Kingdom Patent Application No. 0815067.4, filed Aug. 18, 2008.

BACKGROUND OF THE INVENTION

The present invention relates to a flywheel assembly and more particularly to reduction of the loads experienced during failure of a high speed flywheel.

It is desirable for the weight of a flywheel assembly to be minimised. This generally makes the assembly easier to transport. More particularly, in mobile applications such as use in vehicles, weight reduction becomes particularly beneficial. The assembly does though need to be sufficiently robust to withstand loads generated during failure of a flywheel rotating at high speed.

BRIEF SUMMARY

The present invention provides a flywheel assembly comprising a housing, a flywheel rotatably mounted in the housing and having an inner and an outer circumferential surface, and an inner body spaced radially and inwardly from the inner is circumferential surface of the flywheel, wherein the flywheel rotates in use around and relative to the inner body, the assembly defines an engagement surface spaced radially and outwardly from the outer circumferential surface of the flywheel, and the inner body is flexibly coupled to the housing, such that if the flywheel mounting fails during rotation at speed leading to displacement of the flywheel, flexure of the coupling as a result of forces exerted on the inner body by the displaced flywheel allows the flywheel to contact the engagement surface.

Allowing the flywheel to come into contact with both inner and outer surfaces considerably reduces the loads generated by flywheel failure.

In some embodiments, the flywheel may form the rotor of a motor whilst the inner body forms its stator.

Preferably, the flexible coupling between the inner body and the housing comprises flexible polymeric material. Alternatively, the flexibility may be provided by an arrangement of one or more springs.

BRIEF DESCRIPTION OF THE DRAWINGS

Embodiments of the invention will now be described by way of example and with reference to the accompanying schematic drawings wherein.

DETAILED DESCRIPTION

Figure 1:
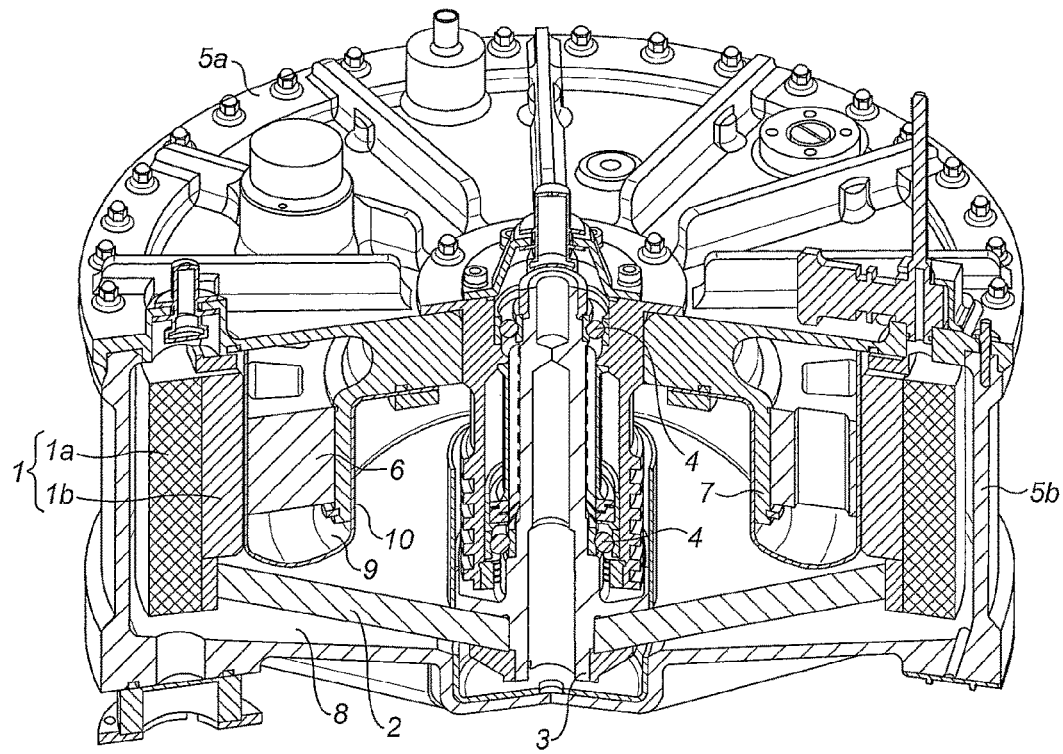
FIG. 1 is a cut-away perspective view of a flywheel assembly.

The flywheel assembly shown in FIG. 1 comprises a rotor formed of magnetically loaded composite material. The rotor has an inner and an outer section (1b and 1a, respectively). The inner section comprises glass fibers and magnetic particles whilst the outer comprises carbon filaments. The two sections are bonded together.

The rotor 1 is rigidly connected to a composite end cap 2. The end cap is mounted on a shaft 3, which is located on ceramic bearings 4. The bearings are supported by a housing or containment 5. This includes a back plate 5a and a cylindrical drum 5b.

The inner section 1b of the rotor forms the permanent magnet component of a motor. The motor also includes a stator 6 mounted on the housing via a stator mount 7. The stator provides the electrical power to drive and brake the flywheel. The motor runs within a vacuum chamber 8, and the stator is oil-cooled by oil circulating via chamber 9 defined the stator can 10.

The flywheel has two primary failure modes. One is "burst failure", where the composite outer section of the rotor fails. The other is "intact rotor failure", where the composite outer section of the rotor remains intact, but either the bearings 4 fail or the composite end cap 2 fails. In the latter case, the rotor spins at high velocity without being constrained by the shaft 3. The resulting vibration loads transmitted to the flywheel mountings can be substantial. The present invention seeks to considerably reduce these loads.

In the flywheel assembly depicted in FIG. 1, stator mount 7 is a rigid structure rigidly mounted on the housing. In flywheel assemblies embodying the invention, the stator is flexibly coupled to the assembly housing. During an intact rotor failure, the rotor is displaced from it normal location relative to the housing, and contacts the outside diameter of the internally mounted stator. Friction between these two components causes the rotor to start a precession motion around the stator. As the is precession frequency increases, the force generated by the rotor's precession also increases, causing the rotor bore and the stator's casing to wear away, increasing the radial clearance. Mounting the stator on suitably designed flexible mountings allows the rotor to move over radially such that the outer diameter of the rotor contacts the inside of the housing.

Friction generated between the rotor and the housing generates a precession motion in the opposite direction to the motion caused by contact with the stator, thereby suppressing an increase in the precession frequency. This reduces the radial force that is generated during the failure.

The magnitude of the forces generated are governed by the stiffness of the flexible mounting, the initial clearance between the outside diameter of the rotor and the bore of the housing, and the initial clearance between the outside diameter of the stator and the bore of the rotor. The lower the stiffness of the mounting, the lower the precession frequency and hence the lower the forces. The stiffness has to be selected such that the natural frequency of the stator mountings does not influence the normal operation of the flywheel energy storage system. To this end, suitable radial damping may be incorporated into the design of the mounting.

Figure 2:
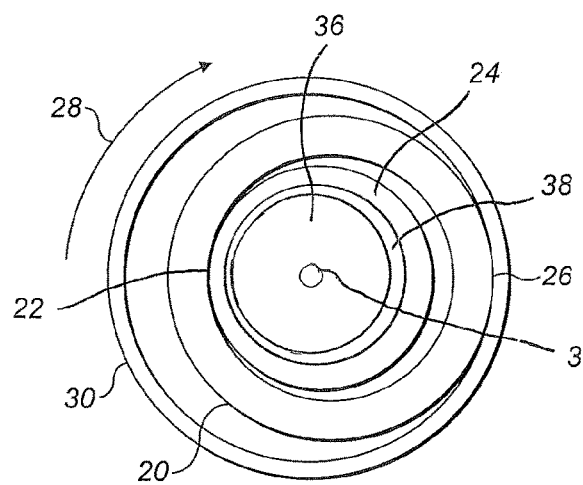
FIG. 2 is a diagram representing a transverse cross-sectional view of a flywheel assembly embodying the invention.
Figure 3:
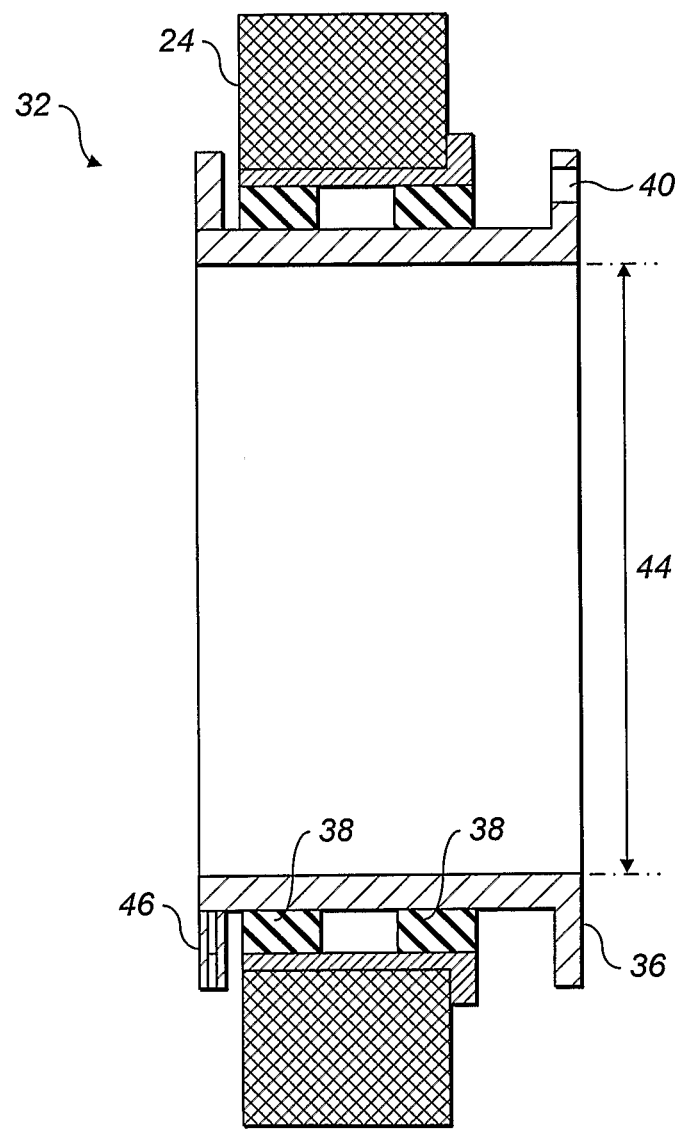
FIG. 3 is a cross-sectional view of a flexible stator mounting according to one embodiment of the invention.

FIG. 2 shows a cross-sectional view of a flywheel assembly embodying the invention in which an intact rotor failure has occurred. The stator (inner body) 24 is flexibly coupled to a hub 36 of the housing 30 by a flexible coupling 38. With the rotor (flywheel) 20 rotating anti-clockwise, this results in anti-clockwise precession of the point of contact 22 between the rotor and the stator (inner body) 24, and a clockwise precession 28 of the point of contact 26 between the rotor and the surrounding body 30.

to FIG. 3 shows an implementation of a flexible stator mount 32 using moulded polymer mounts.

The stator 24 is located on a cylindrical support 34. The support 34 is coupled to a rigid hub via rubber mountings that serve as the flexible coupling 38.

The mountings 38 may be cast in PDMS (or another flexible material compatible with the oil used to cool the stator, such as silicon oil), and are bonded to an outer circumferential surface of the hub 36 and an inner circumferential surface of the support 34.

In one embodiment, the rubber mountings are 10 mm thick in the radial direction and 20 mm wide in the longitudinal direction. Such an arrangement may produce a radial stiffness of 2500 N/mm with a radial movement of 5 mm.

Holes 40 are provided in a flange 42 at one end of the hub 36 for fixing the hub to the back plate of the flywheel housing.

The back plate may be profiled to engage with the inner diameter 44 of the hub to assist its location and retention on the back plate. A retaining collar 46 is held on the outer circumferential surface of the hub by grub screws, at the end of the hub opposite to the flange 42.

Figure 4:
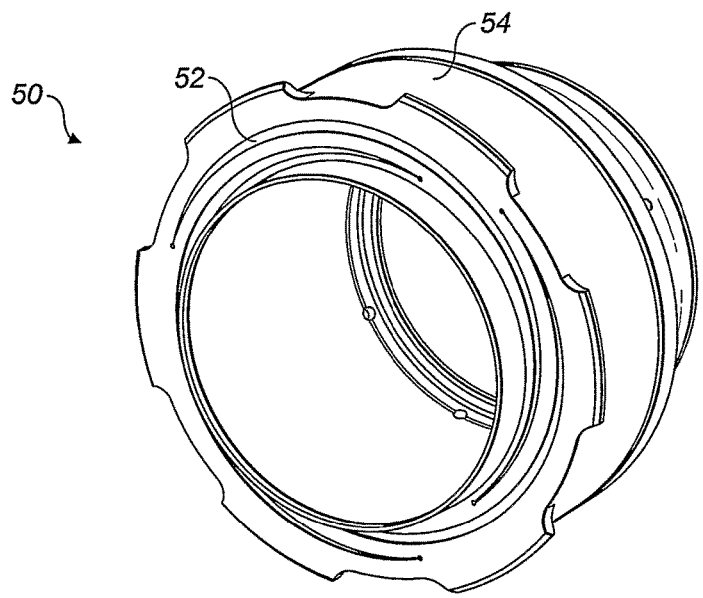
FIG. 4 is a perspective view of a flexible stator mounting according to another embodiment of the invention; and is

FIG. 4 depicts an alternative flexible stator mount 50 using a homogenous steel construction in which curved leaf spring elements 52 form the flexible mountings. An inner cylindrical hub element 56 is mounted rigidly onto the flywheel housing. The stator (not shown) is located on the outer circumferential surface of support element 54. The spring elements 52 extend between the hub and support elements.

Figure 5:
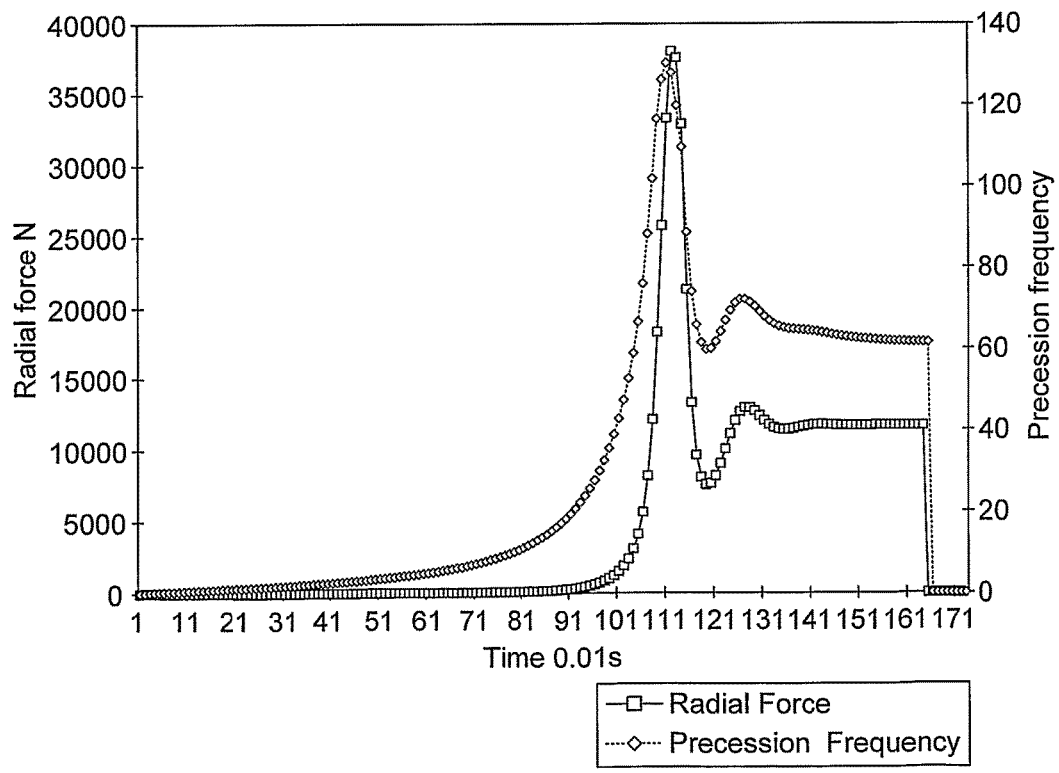
FIG. 5 is a graph plotting radial force and precession frequency against time during a flywheel failure.

FIG. 5 is a graph representing the behaviour of a flywheel assembly embodying the invention during an intact rotor failure. It can be seen that the sudden radial force increase associated with the rotor failure is rapidly decreased, as is the associated precession frequency.

It will be appreciated that although embodiments of the invention are described above which include a motor rotor and stator, the approaches described are also applicable to flywheels having a drive system (either mechanical or electrical) mounted externally, is with a shaft driving the flywheel. In this case, the stator may be replaced by a rigid element which would react to the failure loads in a similar way.

The invention claimed is:

1. A flywheel assembly comprising:
a non-rotating housing;
a shaft rotatably mounted to the housing for rotation with respect to the housing;
a flywheel enclosed within the housing and fixedly mounted to the shaft for rotation with respect to the housing, the flywheel including an inner circumferential surface and an outer circumferential surface;
an engagement surface located radially and outwardly from the outer circumferential surface of the flywheel, the flywheel being rotatable in a normal rotational position with respect to the housing wherein the outer circumferential surface of the flywheel is spaced apart from the engagement surface;
an inner body located radially and inwardly from the inner circumferential surface of the flywheel and spaced apart from the housing, the flywheel adapted to rotate in use around and relative to the inner body;
a flexible coupling flexibly coupling the inner body to the housing, the flexible coupling including one or more flexible mounts located radially and inwardly from the inner body and spacing the inner body radially and outwardly apart from the housing;
wherein when the flywheel is rotating and becomes radially displaced from the normal rotational position to a radially displaced rotational position and the inner circumferential surface of the flywheel contacts the inner body, the flexible coupling enables radial displacement of the inner body relative to the housing such that the outer circumferential surface of the radially displaced flywheel contacts the engagement surface to absorb forces generated by rotation of the radially displaced flywheel.

2. The flywheel assembly of claim 1, wherein the flexible coupling extends radially inwardly away from the inner body.

3. The flywheel assembly of claim 1, wherein the flywheel comprises a rotor of a motor and the inner body comprises a stator of the motor.

4. The flywheel assembly of claim 3, wherein the flexible coupling extends radially inwardly away from the stator.

5. The flywheel assembly of claim 1, wherein each flexible mount comprises a flexible polymeric material.

6. The flywheel assembly of claim 1, wherein the flexible coupling comprises an arrangement of one or more springs.

7. The flywheel assembly of claim 6, wherein the flexible coupling between the inner body and the housing comprises an arrangement of one or more curved leaf springs.

8. The flywheel assembly of claim 1, wherein each flexible mount is coupled to the inner body and is located radially and inwardly with respect to the inner body.

9. The flywheel assembly of claim 8, wherein the inner body is located radially between the one or more flexible mounts and the inner circumferential surface of the flywheel.

10. The flywheel assembly of claim 1 including a hub, the inner body being located around and radially outwardly from the hub and spaced apart from the hub, the one or more flexible mounts being located between the inner body and the hub and flexibly coupling the inner body to the hub, the inner body being spaced apart from the hub by the one or more flexible mounts.

11. The flywheel assembly of claim 10, wherein the hub is connected to the housing.

12. The flywheel assembly of claim 1, wherein each flexible mount is approximately ten millimeters thick in the radial direction.

13. The flywheel assembly of claim 12, wherein each flexible mount is approximately twenty millimeters wide in a longitudinal direction.

14. The flywheel assembly of claim 1, wherein the flexible coupling enables a radial displacement of the inner body relative to the housing of approximately five millimeters.

15. The flywheel assembly of claim 1, wherein the flexible coupling includes a cylindrical support, the cylindrical support being coupled to the inner body and located radially and inwardly with respect to the inner body, the one or more flexible mounts being coupled to an inner circumferential surface of the cylindrical support and located radially and inwardly from the cylindrical support.

16. The flywheel assembly of claim 15 including a cylindrical hub, the cylindrical support extending around the cylindrical hub and spaced apart radially and outwardly from the cylindrical hub, the one or more flexible mounts extending radially between an outer circumferential surface of the cylindrical hub and an inner circumferential surface of the cylindrical support.

17. The flywheel assembly of claim 1, wherein the engagement surface is generally cylindrical.

* * * * *